United States Patent
Zhang et al.

(10) Patent No.: US 11,887,353 B1
(45) Date of Patent: Jan. 30, 2024

(54) DEEP LEARNING IMAGE CLASSIFICATION ORIENTED TO HETEROGENEOUS COMPUTING DEVICE

(71) Applicant: ZHEJIANG LAB, Hangzhou (CN)

(72) Inventors: Beibei Zhang, Hangzhou (CN); Feng Gao, Hangzhou (CN); Mingge Sun, Hangzhou (CN); Chu Zheng, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/549,256

(22) PCT Filed: Jul. 18, 2023

(86) PCT No.: PCT/CN2023/107827
§ 371 (c)(1),
(2) Date: Sep. 6, 2023

(30) Foreign Application Priority Data

Sep. 21, 2022 (CN) .......................... 202211148079.3

(51) Int. Cl.
*G06V 10/764* (2022.01)

(52) U.S. Cl.
CPC .................. *G06V 10/764* (2022.01)

(58) Field of Classification Search
CPC ......... G06V 10/764; G06N 20/00; G06N 3/08
See application file for complete search history.

(56) References Cited

U.S. PATENT DOCUMENTS

| 2003/0085932 | A1 | 5/2003 | Samra | |
| 2015/0302317 | A1* | 10/2015 | Norouzi | G06N 20/00 706/12 |
| 2022/0398460 | A1* | 12/2022 | Dalli | G06F 18/2163 |

FOREIGN PATENT DOCUMENTS

| CN | 109561148 | A | | 4/2019 | |
| CN | 111814966 | A | | 10/2020 | |
| CN | 112297014 | A | | 2/2021 | |
| CN | 112381211 | A | | 2/2021 | |
| CN | 112297014 | B | * | 4/2021 | ........... B25J 9/1605 |
| CN | 114612761 | A | | 6/2022 | |
| CN | 114898217 | A | | 8/2022 | |
| CN | 115249315 | A | | 10/2022 | |

OTHER PUBLICATIONS

Feng Shou "Research on Directed Acyclic Graph Based Hierarchicalmulti-Label Classification Method" "(C)1994-2021 China Academic Journal Electronic Publishing House." Jun. 2019, 141 pages.

(Continued)

*Primary Examiner* — Shaghayegh Azima
(74) *Attorney, Agent, or Firm* — The Small Patent Law Group LLC; Christopher R. Carroll (57) ABSTRACT

The present disclosure relates to deep learning image classification oriented to heterogeneous computing devices. According to embodiments of the present disclosure, the deep learning model can be modeled as an original directed acyclic graph, with nodes representing operators of the deep learning model and directed edges representing data transmission between the operators. Then, a new directed acyclic graph is generated by replacing the directed edges in the original directed acyclic graph with new nodes and adding two directed edges to maintain a topological structure.

9 Claims, 5 Drawing Sheets

(56) References Cited

OTHER PUBLICATIONS

Arthur Cartel Foahom Gouabou etc. "Ensemble Method of Convolutional Neural Networks with Directed Acyclic Graph Using Dermoscopic Images: Melanoma Detection Application""sensors" Jun. 10, 2021 ,19 pages.

ISA State Intellectual Property Office of the People's Republic of China, International Search Report Issued in Application No. PCT/CN2023/107827, dated Oct. 19, 2023, WIPO, 6 pages.

ISA State Intellectual Property Office of the People's Republic of China, Written Opinion of the International Searching Authority Issued in Application No. PCT/CN2023/107827, dated Oct. 19, 2023, WIPO, 8 pages. (Submitted with Machine Translation).

Li Na et al. "Research on Scheduling Method of Layered Heterogeneous Signal Processing Platform", Electronic Science and Technology, vol. 35, Issue 2, Feb. 15, 2022, 7 pages. (Submitted with Machine Translation).

\* cited by examiner

DEEP LEARNING IMAGE CLASSIFICATION ORIENTED TO HETEROGENEOUS COMPUTING DEVICE

CROSS-REFERENCE TO RELATED APPLICATION

The present application is a U.S. National Stage of International Application No. PCT/CN2023/107827, filed on Jul. 18, 2023, which claims the benefit of priority to Chinese Application No. 202211148079.3, filed on Sep. 21, 2022, the contents of all of which are incorporated by reference herein in their entireties for all purposes.

TECHNICAL FIELD

The present disclosure relates to the field of deep learning, and in particular, to deep learning image classification oriented to heterogeneous computing devices.

BACKGROUND

In recent years, deep learning models have been widely used in different scenes, including object detection, speech recognition, machine translation, etc. In these applications, researchers improve accuracy and generalization ability of deep learning models by increasing the number of trainable parameters. For example, a state-of-the-art language model Megatron-NLG has 530 billion parameters, and its accuracy in a next word prediction task of LAMBADA is 87.15%. Large-scale deep learning model based reasoning needs a lot of memory space to store parameters and intermediate variables. However, a memory size of each device is limited and usually unable to carry large-scale deep learning models. For example, a GPT-3 model with 175 billion parameters requires 350 GB of GPU memory, which is far beyond the memory size of any commercially off-the-shelf GPU.

In addition, with the popularity of the Internet of Things (IoT), large-scale deep learning model based reasoning using multiple IoT devices, such as cell phones and smart sensors, is proposed to meet the privacy, latency, and budget requirements of IoT applications. Therefore, people usually hope that a large-scale deep learning model can be divided into multiple sub-models (each sub-model includes at least one operator), and the multiple sub-models are distributed to multiple computing devices for running, so as to meet latency requirements of large-scale deep learning model based reasoning. Generally speaking, end-to-end reasoning latency of the large-scale deep learning model is hoped to be as small as possible, and assignment of operators should consider computing time of each operator on computing devices and network conditions between devices.

This process is modeled as an integer linear programming (ILP) model by an existing method, but this method has the following problems.

Firstly, this method cannot be extended to large-scale computing devices. Typically, the existing modeling can only adapt to three computing devices, which is not applicable to the case that use a large number of IoT devices for reasoning.

Secondly, this method does not take into account that computing time of an operator is different on different devices. However, there are differences in computing power, memory sizes and network transmission capacity (calculated by bandwidths) of different devices. If it is considered that computing time of an operator on any computing device is the same, it will lead to a result of operator assignment cannot guarantee the optimal end-to-end reasoning latency.

SUMMARY

In order to realize collaborative reasoning of a deep learning model on large-scale heterogeneous computing devices and optimal end-to-end image classification latency, the present disclosure adopts the following technical solution.

A deep learning image classification method oriented to heterogeneous computing devices, including:

step S1, modeling a deep learning model as an original directed acyclic graph, and acquiring computing time of operators in the deep learning model to be executed on each of a plurality of computing devices and data transmission time of data between operators to be transferred between two of the computing devices, where nodes of the original directed acyclic graph represent the operators of the deep learning model, and directed edges of the original directed acyclic graph represent data transmission between the operators, and the operators are computing tasks;

step S2, generating a new directed acyclic graph by replacing each of the directed edges in the original directed acyclic graph with a new node to represent a communication task between two of the computing tasks, and adding new directed edges between the new nodes and original nodes to maintain a topology of the original directed acyclic graph;

step S3, setting a plurality of parameters for the plurality of computing devices based on the original directed acyclic graph and the new directed acyclic graph, where the plurality of parameters include processing time and a memory overhead for each of the computing devices to run each of the computing tasks, transmission latency for each of the communication tasks, one or more immediately following task for each of the computing tasks based on the original directed acyclic graph, and one or more immediately following task for each of the computing tasks or each of the communication tasks based on the new directed acyclic graph;

step S4, setting assignment decision parameters, communication decision parameters and time decision parameters, where the assignment decision parameters represent assigning the computing tasks to corresponding computing devices for execution, the communication decision parameters represent communication time of the communication tasks, and the time decision parameters represent start time of the computing tasks;

step S5, constructing one or more constraint condition based on the parameters set in the step S3 and the step S4, and assigning the operators of the deep learning model to the plurality of computing devices for execution with a goal of minimizing reasoning completion time of the deep learning model; and step S6, inputting an image into one or more of the plurality of computing devices to classify the image based on the deep learning model that minimizes the reasoning completion time, where the one or more computing devices are assigned to execute one or more operators that executed first in the deep learning model.

where, the one or more constraint condition includes that: completion time of the computing task or communication task is less than or equal to start time of a direct or indirect immediately following computing task or communication task; when an operator is assigned to a computing device for execution, completion time of the operator is computing start time of the operator plus time required for the computing device to execute the operator;

one of the operators is calculated by one of the computing devices, and is not interrupted in a computing process;

memory size occupied by operators on each of the computing devices cannot exceed memory size of the computing device;

when two operators without a sequential relationship in the original directed acyclic graph are assigned on a computing device for execution, one operator is executed by the computing device at a time;

when two operators that transmit data to each other are assigned to a same computing device for execution, data transmission latency between these two operators can be ignored, when the two operators are assigned to different computing devices for execution, data transmission latency between these two operators cannot be ignored, there is a data transmission latency; and when there are a plurality of communication tasks between two of the computing devices, only one communication task can be executed at a time.

Further, the original directed acyclic graph can be represented as:

$$G=(V,E),$$

where, V represents the nodes in the original directed acyclic graph, and E represents directed edges in the original directed acyclic graph;

the new original directed acyclic graph can be represented as:

$$\overline{G}=(\overline{V},\overline{E}),$$

where, node $\overline{V}$ includes the original node V in the original directed acyclic graph G and new nodes composed of the directed edges E in the original directed acyclic graph; $\overline{E}$ represents the directed edges in the new directed acyclic graph.

Setting a serial number of each of the computing devices to k, and a set of the serial numbers of the plurality of computing devices is K, processing time of a node computing task $i \in V$ on a computing device k is $p_{ik}$, average transmission latency of a communication task $q \in \overline{V}-V$ in a transmission channel k'→k" is $p_{qk'k''}^{comm}$, where the transmission channel k'→k" represents transmitting data from a computing device $k' \in K$ to a computing device $k'' \in K$;

a memory overhead of the node computing task i is $m_i$, a maximum memory limit of the computing device k is $\text{Mem}_k$;

in the original directed acyclic graph G, a set of one or more direct or indirect immediately following tasks for the node computing task i is Succ(i);

in the new directed acyclic graph $\overline{G}$, a set of one or more direct or indirect immediately following tasks for node computing task i or communication task i is $\overline{\text{Succ}}(i)$;

a communication decision parameter $x_{ik} \in \{0,1\}$, $x_{ik}=1$ represents assigning the task i to a kth device for execution; otherwise, $x_{ik}=0$;

communication decision parameters $u_{qk'k''} \in \{0,1\}$ and $z_q$, $u_{qk'k''}=1$ represents that a communication task q existing between the task i and a task j, where $(i,q),(q,j) \in \overline{E}$ selects the transmission channel k'→k", otherwise $u_{qk'k''}=0$, $z_q = \Sigma_{k' \in K} \Sigma_{k'' \in K} u_{qk'k''}=1$ represents communication time of the communication task q existing between the task i and the task j, where $(i,q),(q,j) \in \overline{E}$;

a time decision parameter $S \in \mathbb{R}^+$ represents start time of the task i; and minimizing the reasoning completion time of the deep learning model can be represented as $$\min\left(\max_{i \in V} C_i\right),$$

where, $C_i$ represents completion time of an i th operator, $$\max_{i \in V} C_i$$

represents completion time of a last operator in the deep learning model.

Further, in the one or more constraint condition, the completion time $C_i$ of the ith computing task or communication task is less than or equal to start time $S_i$ of a direct or indirect immediately following computing task or communication task j, and can be represents as:

$$C_i \leq S_j, \forall i \in \overline{V}, \forall j \in \overline{\text{Succ}}(i).$$

Further, in the one or more constraint condition, when the ith operator is assigned to the kth computing device for execution, the completion time $C_i$ of the ith operator is computing start time $S_i$ of the ith operator plus time $p_{ik}$ required for the kth computing device to execute the ith operator, and can be represented as:

$$\&i \ x_{ik}1, \ C_i = S_i + \Sigma_{k \in K} p_{ik} x_{ik}, \forall i \in V.$$

Further, in the one or more constraint condition, one of the operators is calculated by one of the computing devices, and is not interrupted in a computing process, a sum of values of the assignment decision parameters $x_{ik}$ on the K computing devices is 1, and can be represents as:

$$\Sigma_{k \in K} x_{ik} 1.$$

Further, in the one or more constraint condition, a memory size $m_i$ occupied by operators on each of the computing devices k cannot exceed a memory size $\text{Mem}_k$ of the computing device k, and can be represents as:

$$\Sigma_{i \in E} m_i x_{ik} \leq \text{Mem}_k, \forall k \in K.$$

Further, in the one or more constraint condition, when two operators i and j without a sequential relationship in the original directed acyclic graph are assigned on a computing device k for execution, one operator is executed by the computing device k at a time, and can be represents as:

$$S_i \geq C_j - M^s \delta_{ij} - M^l(2 - x_{ik} - x_{jk}),$$

$$S_j \geq C_i - M^s(1 - \delta_{ij}) - M^l(2 - x_{ik} - x_{jk}),$$

where, $i \neq j$, $\forall i,j \in V$, $\forall k \in K$, $i \notin \text{Succ}(j)$ and $j \notin \text{Succ}(i)$.

Further, in the one or more constraint condition, when two operators that transmit data to each other are assigned to a same computing device for execution, transmission latency of the communication task q between these two operators can be ignored; when two operators i and j that transmit data to each other are assigned to different computing devices k' and k", the communication task q between the operators selects at most one transmission channel k'→k", $x_{ik}=x_{jk''}=1$, and transmission latency between start time $S_q$ and end time $C_q$ of the communication task q cannot be ignored, there is a data transmission latency, which can be represented as:

$z_q \leq 2-x_{ik}x_{jk}, \forall q \in \overline{V}-V, (i,q),(q,j) \in \overline{E}, \forall k \in K,$ $z_q \geq x_{ik}-x_{jk}, \forall q \in \overline{V}-V, (i,q),(q,j) \in \overline{E}, \forall k \in K,$ $z_q \geq x_{jk}-x_{ik}, \forall q \in \overline{V}-V, (i,q),(q,j) \in \overline{E}, \forall k \in K,$ $u_{qk'k''} \geq x_{ik}+x_{jk''}-1, \forall q \in \overline{V}-V, (i,q),(q,j) \in \overline{E}, \forall k', k'' \in K,$
and $k' \neq k''$, $z_q = \Sigma_{k' \in K} \Sigma_{k'' \in K} u_{qk'k''},$ $C_q = S_q + z_q p_{qk'k''}^{comm}, \forall q \in \overline{V}-V.$ Further, in the one or more constraint condition, when there are a plurality of communication tasks q and r between two of the computing devices, one communication task q or r is executed at a time, and can be represented as:

$S_q \geq C_r - M^s \delta_{qr} - M^l(2-z_q-z_r) + M^r(x_{ak}+x_{ck}-x_{bk}-x_{dk}-2),$ $S_r \geq C_q - M^s(1-\delta_{qr}) - M^l(2-z_q-z_r) + M^r(x_{ak}+x_{ck}-x_{bk}-x_{dk}-2),$ $S_q \geq C_r - M^s \delta_{qr} - M^l(2-z_q-z_r) + M^r(x_{bk}+x_{dk}-x_{ak}-x_{ck}-2),$ $S_r \geq C_q - M^s(1-\delta_{qr}) - M^l(2-q_q-z_r) + M_r(x_{bk}+x_{dk}-x_{ak}x_{ck}-2),$ where, $S_q$ represents start time of the communication task q;

$C_q$ represents end time of the communication task q;
$S_r$ represents start time of a communication task r;
$C_r$ represents end time of the communication task r;
$\delta_{qr} \in \{0,1\}$ represents an indicator variable; and $\forall q, r \in \overline{V}-V, q \notin \overline{Succ}(r)$ and, $r \notin \overline{Succ}(q), q \neq r, (a,q),(q,b),(c,r), (r,d) \in \overline{E}, \forall k \in K;$
$M^s, M^l, M^r$ represent numbers tending to positive infinity relative to an index variable, a communication strategy and an assignment strategy, respectively.

A deep learning image classification apparatus oriented to heterogeneous computing devices, including one or more memories and one or more processors, where executable codes are stored in the memory, and when the executable codes are executed by the one or more processors, the deep learning image classification method oriented to heterogeneous computing devices is realized.

According to the deep learning image classification methods and apparatuses oriented to heterogeneous computing devices, by establishing a new directed acyclic graph to match with an original directed acyclic graph modeled from a deep learning model, parameters based on computing devices, computing tasks, communication tasks and corresponding constraint conditions are constructed, so as to reasonably assign a plurality of operators in the deep learning model to a plurality of computing devices with a goal of minimizing a reasoning completion time of the deep learning model, thereby effectively improving the efficiency of executing the deep learning model for image classification by a plurality of computing devices.

DETAILED DESCRIPTION

Specific implementations of the present disclosure are described in detail below in conjunction with the accompanying drawings. It should be understood that the specific implementations described herein are only used to illustrate and explain the present disclosure, and are not used to limit the present disclosure.

Figure 1:
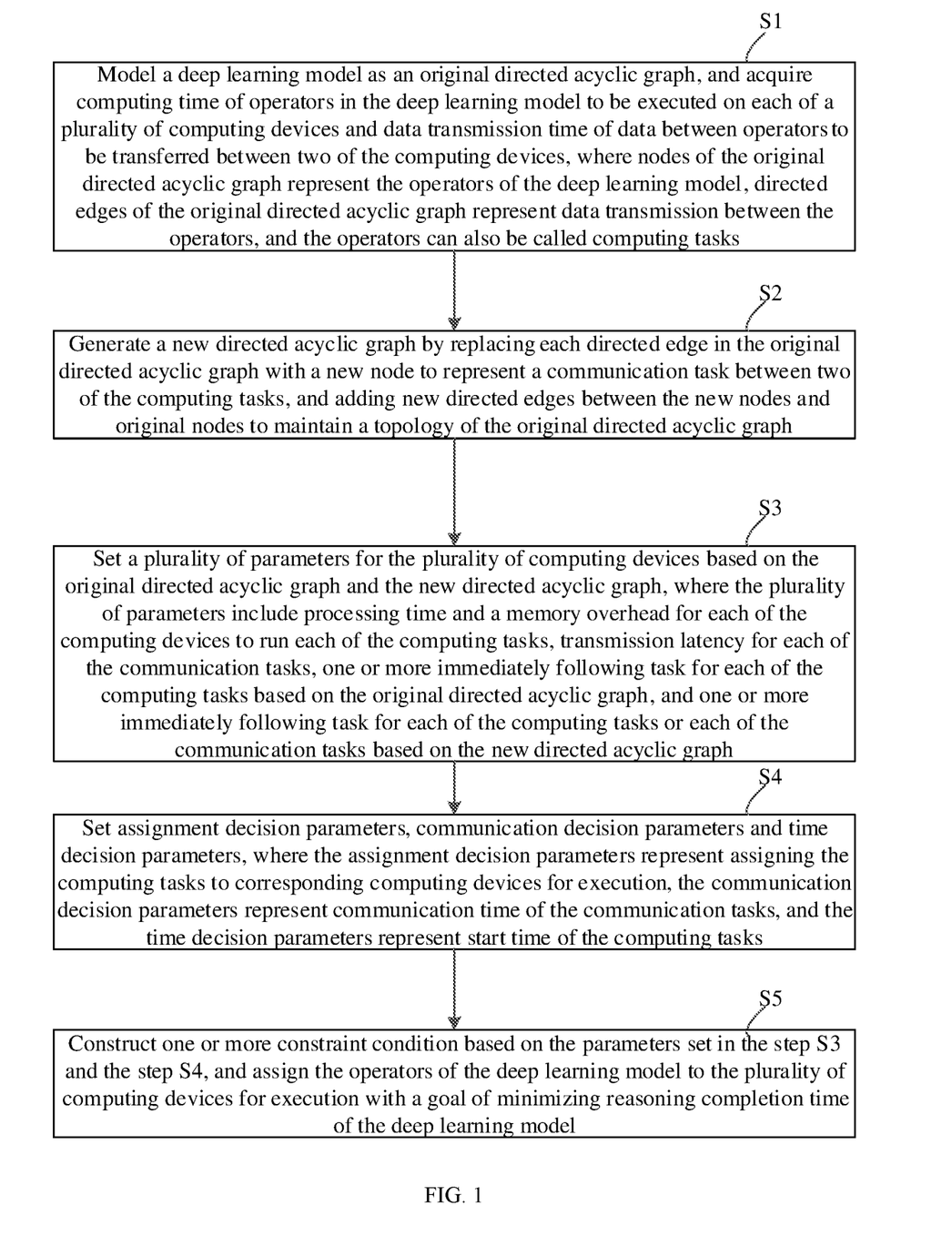
FIG. 1 is a flowchart of a deep learning image classification method oriented to heterogeneous computing devices according to an embodiment of the present disclosure.

As shown in FIG. 1, a deep learning image classification method oriented to heterogeneous computing devices includes the following steps.

At step S1, a deep learning model is modeled as an original directed acyclic graph, and computing time of operators in the deep learning model to be executed on each of a plurality of computing devices and data transmission time of data between operators to be transferred between two of the computing devices are acquired. Nodes of the original directed acyclic graph represent the operators of the deep learning model (which can also be called computing tasks), and directed edges of the original directed acyclic graph represent data transmission between the operators.

Figure 2A:
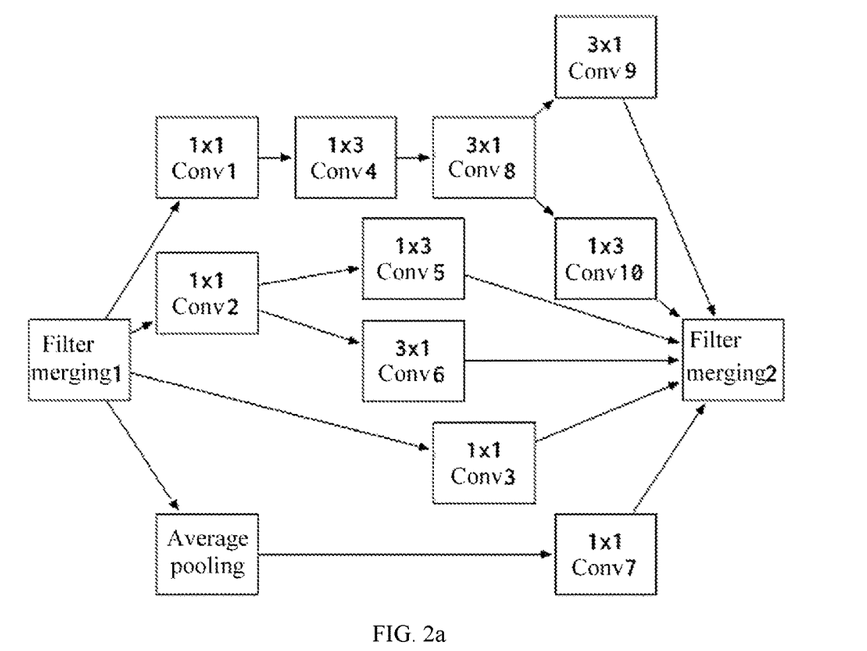
FIG. 2a is a structural schematic diagram of a deep learning model Inceptionv4 Block C according to an embodiment of the present disclosure.
Figure 2B:
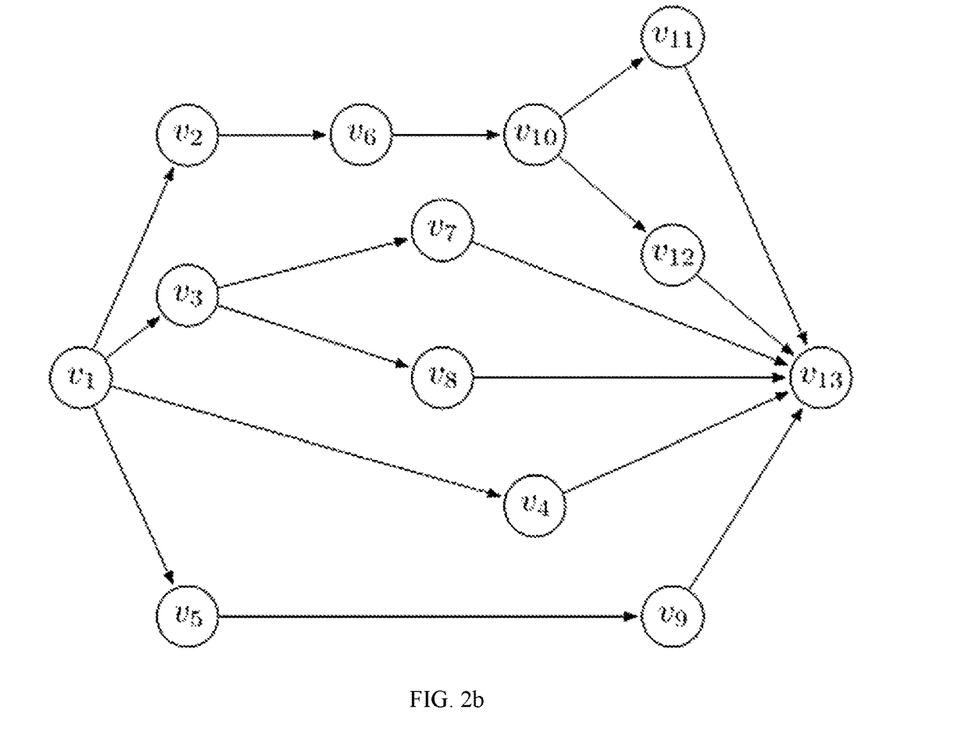
FIG. 2b is a structural schematic diagram of a directed acyclic graph (DAG) modeled based on the deep learning model shown in FIG. 2a according to an embodiment of the present disclosure.

As shown in FIG. 2a and FIG. 2b, a deep learning model Inceptionv4 Block C shown in FIG. 2a can be modeled as a directed acyclic graph G shown in FIG. 2b. Nodes v1 to v13 in the directed acyclic graph shown in FIG. 2b correspond to filter merging operators, convolution operators and an average pooling operator in the deep learning model shown in FIG. 2a, respectively.

Figure 3A:
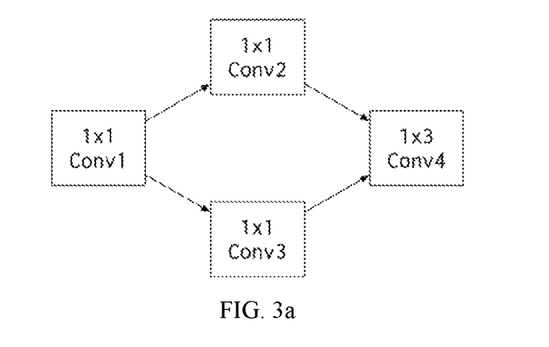
FIG. 3a is a structural schematic diagram of a deep learning model according to an embodiment of the present disclosure.
Figure 3B:
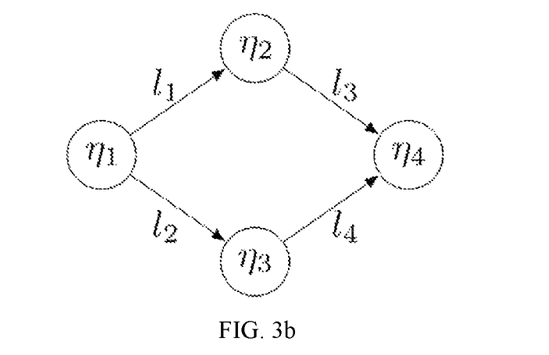
FIG. 3b is a directed acyclic graph G=(V,E) modeled based on the deep learning model shown in FIG. 3a according to an embodiment of the present disclosure.

Specifically, as shown in FIG. 3a, a deep learning model is given. Convolutional operator Conv1 connects convolutional operator Conv2 and convolutional operator Conv3, which in turn are both connected to convolutional operator Conv4. The deep learning model can be modeled as an original directed acyclic graph, as shown in FIG. 3b, and denoted as:

G=(V,E).

Nodes $V=\{\eta_1,\eta_2,\eta_3,\eta_4\}$ in the original directed acyclic graph G represent operators of the deep learning model,
node $\eta_1$ corresponds to the operator Conv1,
node $\eta_2$ corresponds to the operator Conv2,
node $\eta_3$ corresponds to the operator Conv3, and
node $\eta_4$ corresponds to the operator Conv4.

Directed edges $E=\{l_1,l_2,l_3,l_4\}$ in the original directed acyclic graph G represent data transmission between the operators of the deep learning model,
  directed edge $l_1$ corresponds to data transmission between the operators Conv1 and Conv2,
  directed edge $l_2$ corresponds to data transmission between the operators Conv1 and Conv3,
  directed edge $l_3$ corresponds to data transmission between the operators Conv2 and Conv4, and
  directed edge $l_4$ corresponds to data transmission between the operators Conv3 and Conv4.

At step S2, a new directed acyclic graph is generated by replacing each directed edge in the original directed acyclic graph with a new node to represent a communication task between two of the computing tasks, and adding new directed edges between the new nodes and original nodes to maintain a topology of the original directed acyclic graph.

Figure 3C:
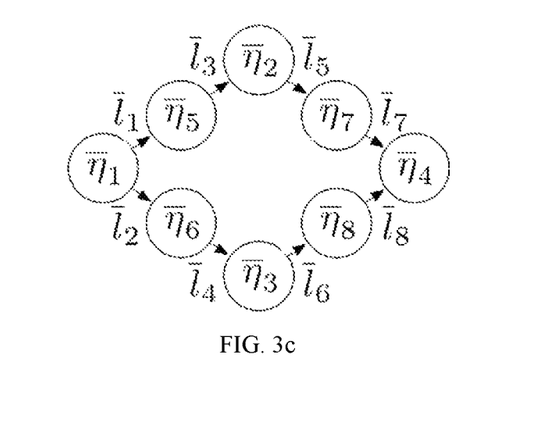
FIG. 3c is a new directed acyclic graph $\overline{G}=(\overline{V},\overline{E})$ converted from the directed acyclic graph shown in FIG. 3b according to an embodiment of the present disclosure.

As shown in FIG. 3c, the new original directed acyclic graph is denoted as:

$$\overline{G}=(\overline{V},\overline{E}).$$

Nodes $\overline{V}=\{\overline{\eta}_1,\overline{\eta}_2,\overline{\eta}_3,\overline{\eta}_4,\overline{\eta}_5,\overline{\eta}_6,\overline{\eta}_7,\overline{\eta}_8\}$ in the new original directed acyclic graph $\overline{G}$ include the original nodes V in the original directed acyclic graph G and new nodes composed of directed edges E in the original directed acyclic graph; where:
  node $\overline{\eta}_1$ corresponds to node $\eta_1$ in the original directed acyclic graph G,
  node $\overline{\eta}_2$ corresponds to node $\eta_2$ in the original directed acyclic graph G,
  node $\overline{\eta}_3$ corresponds to node $\eta_3$ in the original directed acyclic graph G,
  node $\overline{\eta}_4$ corresponds to node $\eta_4$ in the original directed acyclic graph G,
  node $\overline{\eta}_5$ corresponds to the directed edge $l_1$ in the original directed acyclic graph G to represent the communication task between nodes $\overline{\eta}_1$ and $\overline{\eta}_2$ (hereinafter also referred to as transmission tasks),
  node $\overline{\eta}_6$ corresponds to the directed edge $l_2$ in the original directed acyclic graph G to represent the communication task between nodes $\overline{\eta}_1$ and $\overline{\eta}_3$,
  node $\overline{\eta}_7$ corresponds to the directed edge $l_3$ in the original directed acyclic graph G to represent the communication task between nodes $\overline{\eta}_2$ and $\overline{\eta}_4$, and
  node $\overline{\eta}_8$ corresponds to the directed edge $l_4$ in the original directed acyclic graph G to represent the communication task between nodes $\overline{\eta}_3$ and $\overline{\eta}_4$.

Directed edges $\overline{E}=\{\overline{l}_1,\overline{l}_2,\overline{l}_3,\overline{l}_4,\overline{l}_5,\overline{l}_6,\overline{l}_7,\overline{l}_8\}$ in the new directed acyclic graph $\overline{G}$ are used to maintain a topological structure of the original directed acyclic graph G.

At step S3, a plurality of parameters are constructed for the plurality of computing devices based on the original directed acyclic graph and the new directed acyclic graph. The plurality of parameters include processing time and a memory overhead for each of the computing devices to run each of the computing tasks, transmission latency for each of the communication tasks, one or more immediately following task for each of the computing tasks based on the original directed acyclic graph, and one or more immediately following task for each of the computing tasks or each of the communication tasks based on the new directed acyclic graph.

Figure 4:
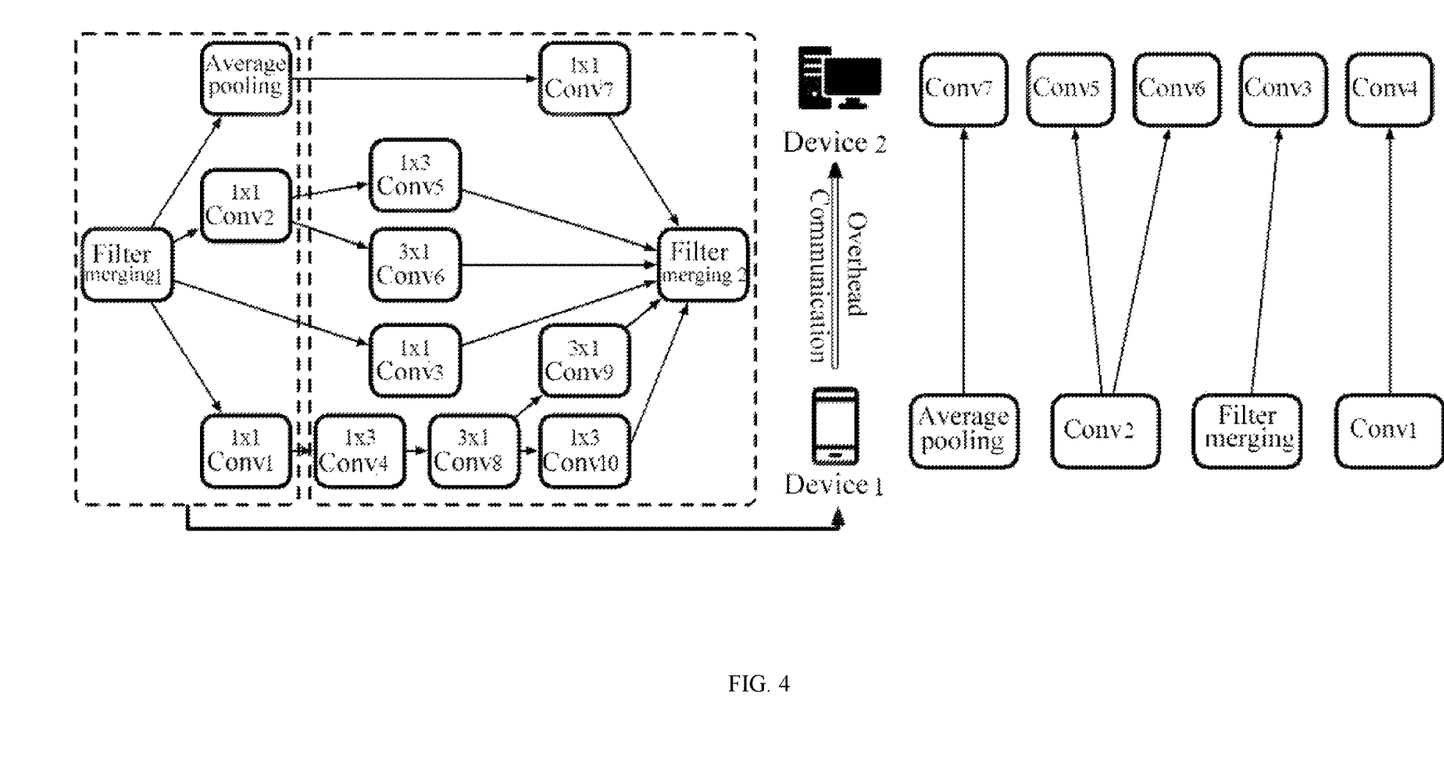
FIG. 4 is a schematic diagram of placing a deep learning model Inceptionv4 Block C on a plurality of heterogeneous computing devices for running according to an embodiment of the present disclosure.

For example, for placing the deep learning model Inceptionv4 Block C on a plurality of heterogeneous computing devices for running as shown in FIG. 4, it can be set as follows:
  a computing device serial number is k, and a set of all device serial numbers is K,
  processing time of a node's computing task $i\in V$ on the device k is $p_{ik}$;
  average transmission latency of a communication task $q\in \overline{V}-V$ in a transmission channel $k'\to k''$ is $p_{qk'k''}^{comm}$, where the transmission channel $k'\to k''$ represents transmitting data from a computing device $k'\in K$ to a computing device $k''\in K$;
  a memory overhead of the node's computing task i is $m_i$,
  a maximum memory limit of the computing device k is $Mem_k$;
  three numbers $M^s, M^l, M^r$ that tend to be positive infinity relative to an index variable, a communication strategy and an assignment strategy, respectively;
  in the original directed acyclic graph G, a set of one or more direct or indirect immediately following tasks for the computing task i is Succ(i); and
  in the new directed acyclic graph $\overline{G}$, a set of one or more direct or indirect immediately following tasks for the computing task i or transmission task i is $\overline{Succ}(i)$.

For another example, for placing the deep learning model shown in FIG. 3a on two Raspberry Pi computing devices for running, a corresponding original directed acyclic graph G=(V,E) is shown in FIG. 3b, and a new directed acyclic graph converted from the original directed acyclic graph $\overline{G}=(\overline{V},\overline{E})$ is shown in FIG. 3c, which can be given as follows:
  available memory sizes of the two Raspberry Pi computing devices K={1,2} are 1.2 GB and 800 MB, respectively, and a data transmission bandwidth between the two devices is 80 Mbps;
  processing time of a computing task $i\in V=\{\eta_1,\eta_2,\eta_3,\eta_4\}$ on the device 1 is $p_{i1}$,
  processing time of the computing task $i\in V$ on the device 2 is $p_{i2}$;
  average transmission latency of a communication task $q\in \overline{V}-V=\{\overline{\eta}_5,\overline{\eta}_6,\overline{\eta}_7,\overline{\eta}_8\}$ is $p_q^{comm}$;
  a memory overhead of the computing task $i\in V=\{\eta_1,\eta_2,\eta_3,\eta_4\}$ is $m_i$,
  a maximum memory limit of a computing device $k\in K$ is $\{Mem_1=1200\ MB,\ Mem_2=800\ MB\}$;
  $M^s, M^l, M^r \geq 2^{100}$;
  $\forall i\in V,\ Succ(\eta_1)=\{\eta_2,\eta_3,\eta_4\}$,
    $Succ(\eta_2)=\{\eta_4\}$,
    $Succ(\eta_3)=\{\eta_4\}$, and
    $Succ(\eta_4)=\emptyset$; and
  $\forall i\in \overline{V},\ \overline{Succ}(\overline{\eta}_1)=\{\overline{\eta}_2,\overline{\eta}_3,\overline{\eta}_4,\overline{\eta}_5,\overline{\eta}_6,\overline{\eta}_7,\overline{\eta}_8\}$,
    $\overline{Succ}(\overline{\eta}_2)=\{\overline{\eta}_4,\overline{\eta}_7\}$,
    $\overline{Succ}(\overline{\eta}_3)=\{\overline{\eta}_4,\overline{\eta}_8\}$,
    $\overline{Succ}(\overline{\eta}_4)=\emptyset$,
    $\overline{Succ}(\overline{\eta}_5)=\{\overline{\eta}_2,\overline{\eta}_4,\overline{\eta}_7\}$,
    $\overline{Succ}(\overline{\eta}_6)=\{\overline{\eta}_3,\overline{\eta}_4,\overline{\eta}_8\}$,
    $\overline{Succ}(\overline{\eta}_7)=\{\overline{\eta}_4\}$, and
    $\overline{Succ}(\overline{\eta}_8)=\{\overline{\eta}_4\}$.

At step S4, assignment decision parameters, communication decision parameters and time decision parameters are set, where the assignment decision parameter represents assigning the computing tasks to corresponding computing devices for execution, the communication decision parameters represent communication time of the communication tasks, and the time decision parameters represent start time of the computing tasks.

Specifically, for an assignment decision parameter $x_{ik}\in\{0,1\}$, $x_{ik}=1$ represents that a task i is assigned to a kth device for execution, while $x_{ik}=0$ indicates that the task i is not assigned to the kth device for execution. For example, the assignment decision parameter $x_{i1}=1$ represents that the task i is assigned to a 1st device for execution.

For communication decision parameters $u_{qk'k''} \in \{0,1\}$ and $z_q$, $u_{qk'k''}=1$ represents that a communication task q existing between the task i and a task j, where (i,q),(q,j)∈$\overline{E}$, selects a transmission channel k'→k", otherwise $u_{qk'k''}=0$; and $z_q = \Sigma_{k' \in K} \Sigma_{k'' \in K} u_{qk'k''} 32\ 1$ represents communication time of the communication task q existing between the task i and the task j, where (i,q),(q,j)∈$\overline{E}$.

A time decision parameter $S_i \in \mathbb{R}^+$ represents start time of the task i. Generally speaking, the time decision parameter will affect the scheduling algorithm oriented to heterogeneous computing devices to some extent.

At step S5, one or more constraint condition is constructed based on the parameters set in the step S3 and the step S4, and the operators of the deep learning model are assigned to the plurality of computing devices for execution with a goal of minimizing reasoning completion time of the deep learning model.

For the computing task i∈V, completion time of an ith operator is represented by $C_i$. Reasoning completion time of a deep learning model is determined by completion time of its last operator, so $$\max_{i \in V} C_i$$

$C_i$ can be used to represent the reasoning completion time of the deep learning model. Correspondingly, the goal is to minimize this reasoning completion time, which is represented by $$\min \left( \max_{i \in V} C_i \right).$$

Specifically, as shown in FIG. 3b, the reasoning completion time of the deep learning model may be represented as completion time of the last operator $\eta_4$ of the deep learning model, i.e., $$\max_{i \in V} C_i = C_{\eta_4},$$

$C_i = C_{\eta_4}$, and $\min(C_{\eta_4})$ is used to represent minimizing this reasoning completion time.

Correspondingly, constraint conditions can include the following.

For the ith computing or communication task, the end time $C_i$ must be less than or equal to start time $S_i$ of its direct or indirect immediately following task j, which can be represented as:

$C_i \leq S_i$, where, $\forall i \in \overline{V}$, $\forall j \in \overline{\text{Succ}}(i)$.

When the ith operator is assigned to the kth computing device, its completion time can be represented as calculation start time plus time required for calculation, that is:

$C_i = S_i + \Sigma_{k \in K} p_{ik} x_{ik}$, where, $\forall i \in V$, k refers to the kth device.

In addition, an operator is only calculated by a computing device, and cannot be interrupted in a computing process. Therefore, a sum of the assignment decision parameters $x_{ik}$ on all K computing devices is 1, and can be represented as:

$\Sigma_{k \in K} x_{ik} = 1$.

Memory size occupied by operators on each device cannot exceed memory size of the device, and can be represented as:

$\Sigma_{i \in V} m_i x_{ik} \leq \text{Mem}_k$, $\forall k \in K$.

Only one operator can be executed by a computing device at a time. Therefore, for two operators i and j without a sequential relationship in the directed acyclic graph, when they are assigned to a same device for execution, their execution time cannot overlap, and this relationship can be established by the following model:

$S_i \geq C_j - M^s \delta_{ij} - M^l(2 - x_{ik} - x_{jk})$, and $S_j \geq C_i - M^s(1 - \delta_{ij}) - M^l(2 - x_{ik} - x_{jk})$, where, i≠j, $\forall i,j \in V$, $\forall k \in K$, i∉Succ(j) and j∉Succ(i).

When two operators that transmit data to each other are assigned to a same device for execution, data transmission time between these two operators can be ignored. However, when two operators i and j that transmit data to each other are assigned to different computing devices k' and k" for execution, the communication task q between the operators i and j selects at most one transmission channel k'→k", that is $x_{ik'}=x_{jk''}=1$, and transmission latency between start time $S_q$ and end time $C_q$ of the communication task q cannot be ignored, that is, there is the data transmission latency. Therefore, for the data communication task q, q∈$\overline{V}$−V, the above situation can be represented by modeling as follows:

$z_q \leq 2 - x_{ik} x_{jk}$, $\forall q \in \overline{V}-V$, (i,q),(q,j)∈$\overline{E}$, $\forall k \in K$, $z_q \geq x_{ik} - x_{jk}$, $\forall q \in \overline{V}-V$, (i,q),(q,j)∈$\overline{E}$, $\forall k \in K$, $z_q \geq x_{jk} - x_{ik}$, $\forall q \in \overline{V}-V$, (i,q),(q,j)∈$\overline{E}$, $\forall k \in K$, $u_{qk'k''} \geq x_{ik'} + x_{jk''} - 1$, $\forall q \in \overline{V}-V$, (i,q),(q,j)∈$\overline{E}$, $\forall k'$, $k'' \in K$, and $k' \neq k''$, $z_q = \Sigma_{k' \in K} \Sigma_{k'' \in K} u_{qk'k''}$, $C_q = S_q + z_q p_{qk'k''}^{comm}$, $\forall q \in \overline{V}-V$.

In addition, when there are a plurality of communication tasks between two computing devices, only one communication task can be executed at a time, so this relationship is established by the following model:

$S_q \geq C_r - M^s \delta_{qr} - M^l(2 - z_q - z_r) + M^r(x_{ak} + x_{ck} - x_{bk} - x_{dk} - 2)$, $S_r \geq C_q - M^s(1 - \delta_{qr}) - M^l(2 - z_q - z_r) + M^r(x_{ak} + x_{ck} - x_{bk} - x_{dk} - 2)$, $S_q \geq C_r - M^s \delta_{qr} - M^l(2 - z_q - z_r) + M^r(x_{bk} + x_{dk} - x_{ak} - x_{ck} - 2)$, and $S_r \geq C_q - M^s(1 - \delta_{qr}) - M^l(2 - q_q - z_r) + M_r(x_{bk} + x_{dk} - x_{ak} x_{ck} - 2)$.

$S_q$ represents the start time of the communication task q; $C_q$ represents the end time of the communication task q; $S_r$ represents start time of a communication task r; $C_r$ represents end time of the communication task r; $\delta_{qr} \in \{0,1\}$ represents an indicator variable; and $\forall q$, r∈ $\overline{V}-V$, q∉$\overline{\text{Succ}}$(r) and r∉$\overline{\text{Succ}}$(q), q≠r, (a,q),(q,b),(c,r),(r,d)∈$\overline{E}$, $\forall k \in K$.

Specifically, for the directed acyclic graphs shown in FIGS. 3b and 3c, it can be assumed that:

$p_{\eta_1 1}=100$ ms, $p_{\eta_1 2}=500$ ms,
$p_{\eta_2 1}=50$ ms, $p_{\eta_2 2}=400$ ms,
$p_{\eta_3 1}=50$ ms, $p_{\eta_3 2}=400$ ms,
$p_{\eta_4 1}=700$ ms, $p_{\eta_4 2}=50$ ms;

$p_{\overline{\eta}_5}^{comm}$=200 ms,
$p_{\overline{\eta}_6}^{comm}$=200 ms,
$p_{\overline{\eta}_7}^{comm}$=30 ms, and
$p_{\overline{\eta}_8}^{comm}$=30 ms.

At step S6, an image is input into one or more of the plurality of computing devices to classify the image based on the deep learning model that minimizes the reasoning completion time, where the one or more computing devices are assigned to execute one or more operators that executed first in the deep learning model.

In an embodiment of the present disclosure, for an image classification task based on deep learning, an image of size 3*224*224 may be processed using a segmented deep learning model. Taking a deep learning model of FIG. 3a as an example, after assigning operators segmented from the deep learning model to device 1 and device 2 based on the above method, an image is first input to the device 1, and the conv1 operator on the device 1 performs the convolution operation on the image to generate a corresponding feature map. The feature map is used as an input for the conv2 and conv3 operators located on the device 1, and the conv2 and conv3 operators process the feature map to generate two new feature maps. The two new feature maps located on the device 1 will be transmitted to the device 2 through the communication between the device 1 and the device 2. The conv4 operator in the device 2 processes the received two new feature maps and generates a final classification result through a classification module, and an end-to-end latency of a whole process is about 230 ms. In contrast, if all the operators of the deep learning model are placed on the device 1 for image classification and recognition, the end-to-end delay is about 850 ms. If all the operators of the deep learning model are placed on the device 2 for image classification and recognition, the end-to-end delay is about 950 ms. It is evident that the method according to the embodiments of the present disclosure significantly reduces the end-to-end latency of the deep learning model based on two devices during image classification and recognition.

Corresponding to the aforementioned embodiment of the deep learning image classification method oriented to heterogeneous computing devices, the present disclosure further provides an embodiment of a deep learning image classification apparatus oriented to heterogeneous computing devices.

Figure 5:
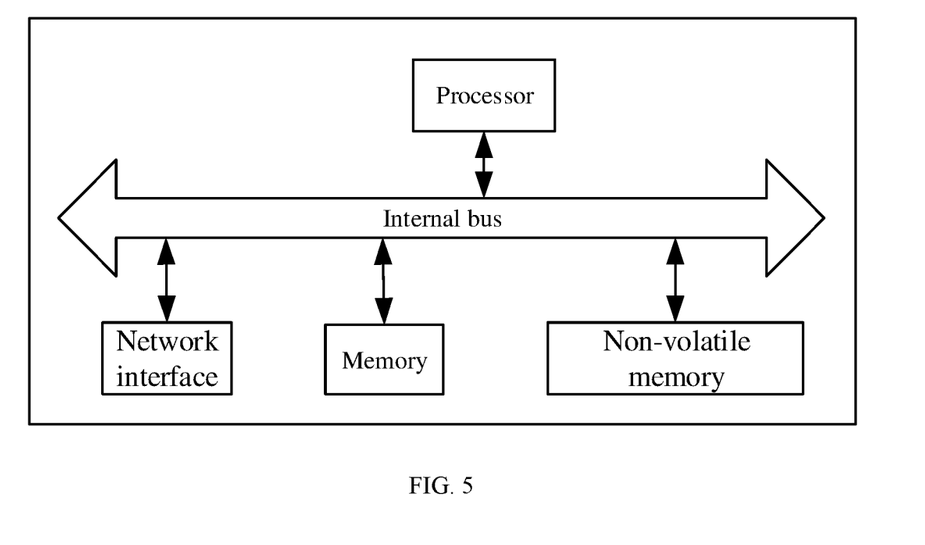
FIG. 5 is a structural schematic diagram of a deep learning image classification apparatus oriented to heterogeneous computing devices according to an embodiment of the present disclosure.

Referring to FIG. 5, embodiments of the present disclosure provide a deep learning image classification apparatus oriented to heterogeneous computing devices, including one or more memories, such as memory and non-volatile memory, and one or more processors. The memory stores executable code, and when the executable code is executed by the one or more processors, it is used to realize the deep learning image classification method oriented to heterogeneous computing devices in the above embodiments.

Embodiments of the deep learning image classification apparatus oriented to heterogeneous computing devices in the present disclosure can be applied to any device with data processing capability, which can be a device or apparatus such as a computer. Embodiments of the apparatus can be realized by software, or by hardware or a combination of hardware and software. Taking realized by software as an example, as an apparatus in a logical sense, is formed by reading corresponding computer program instructions from non-volatile memory into memory and running them through the processor of any device with data processing capability in which it is located. In terms of hardware, as shown in FIG. 5, it is a hardware structure diagram of any device with data processing capability where a deep learning image classification apparatus oriented to heterogeneous computing devices of the present disclosure is located. In addition to the processor, memory, network interface and non-volatile memory shown in FIG. 5, any device with data processing capability where the apparatus is located in the embodiment usually includes other hardware according to the actual functions of the any device with data processing capability, which will not be described here again.

The process of realizing the functions and roles of each unit in the above apparatus is detailed in the process of realizing the corresponding steps in the above method and will not be repeated here.

For the apparatus embodiment, because it basically corresponds to the method embodiment, it is only necessary to refer to the method embodiment for the relevant part of the description. The apparatus embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. It can be understood and implemented by a person of ordinary skill in the art without creative labor.

Embodiments of the present disclosure further provides a computer-readable storage medium, on which a program is stored, which, when executed by a processor, realizes the deep learning image classification method oriented to heterogeneous computing devices in the above embodiments.

The computer-readable storage medium can be an internal storage unit of any device with data processing capability described in any of the previous embodiments, such as a hard disk or a memory. The computer-readable storage medium can also be an external storage device of any device with data processing capability, such as a plug-in hard disk, smart media card (SMC), SD card, flash card, etc. provided on the device. Further, the computer-readable storage medium can further include both internal storage units and external storage devices of any device with data processing capability. The computer-readable storage medium is configured to store the computer program and other programs and data required by any equipment with data processing capability, and can further be configured to temporarily store data that has been output or will be output.

The above embodiments are only used to illustrate the technical solution of the present disclosure, but not to limit it. Although the present disclosure has been described in detail with reference to the foregoing embodiments, it should be understood by those skilled in the art that the technical solution described in the foregoing embodiments can still be modified, or some or all of its technical features can be replaced by equivalents. However, these modifications or substitutions do not make the essence of the corresponding technical solution deviate from the scope of the technical solution of the embodiment of the present disclosure.

The invention claimed is:

1. A deep learning image classification method oriented to heterogeneous computing devices, comprising:
   modeling a deep learning model as a directed acyclic graph, wherein nodes of the directed acyclic graph represent operators of the deep learning model, directed edges of the directed acyclic graph represent data transmission between the operators, and acquiring computing time of the operators on each of computing devices and data transmission time of data between operators to be transferred between two of the computing devices;

wherein an original directed acyclic graph G is represented as:

$$G=(V,E)$$

wherein, V represents nodes of the original directed acyclic graph G, and E represents directed edges of the original directed acyclic graph G;

a new directed acyclic graph $\overline{G}$ is represented as:

$$\overline{G}=(\overline{V},\overline{E})$$

wherein, a new node $\overline{V}$ comprises the node V of the original directed acyclic graph G and new nodes composed of the directed edges E of the original directed acyclic graph G; $\overline{E}$ represents new directed edges;

setting a serial number of each of the computing devices to k, and a set of the serial numbers of all of computing devices is K, processing time of a computing task $i \in V$ on a computing device k is $p_{ik}$, average transmission latency of a communication task $q \in \overline{V}-V$ is $p_{qk'k''}^{comm}$, a memory overhead of the computing task i is $m_i$, a maximum memory limit of the computing device k is $Mem_k$, in the original directed acyclic graph G, a set of one or more direct or indirect immediately following tasks for the computing task i is Succ(i); in the new directed acyclic graph $\overline{G}$, a set of one or more direct or indirect immediately following tasks for computing task i or communication task i is $\overline{Succ}(i)$;

an assignment decision parameter $x_{ik} \in \{0,1\}$, $x_{ik}=1$ represents assigning the computing task i to a kth device for execution; a communication decision parameter $z_q=1$ represents communication time of a communication task q existing between the computing task i and a computing task j, where $(i,q),(q,j) \in \overline{E}$; a time decision parameter $S_i \in \mathbb{R}^+$ represents start time of a computing task i or communication task i; and minimizing the reasoning completion time of the deep learning model is represented as:

$$\min\left(\max_{i \in V} C_i\right),$$

wherein, $C_i$ represents completion time of an ith operator, $$\max_{i \in V} C_i$$

represents completion time of a last operator that ends a computation in the deep learning model;

generating a new directed acyclic graph by replacing each of the directed edges in the directed acyclic graph with a new node, and adding new directed edges between the new nodes and original nodes;

constructing processing time and a memory overhead for each of the computing devices to run each of computing tasks, transmission latency for each of communication tasks, one or more immediately following task for each of computing tasks based on the directed acyclic graph, and one or more immediately following task for each of the computing tasks or each of the communication tasks based on the new directed acyclic graph;

setting assignment decisions, communication decisions and time decisions, wherein the assignment decisions represent assigning the computing tasks to corresponding computing devices, the communication decisions represent communication time of the communication tasks, and the time decisions represent start time of the computing tasks;

dividing the deep learning model into a plurality of operators, and assigning the plurality of operators to a plurality of computing devices for execution, constructing one or more constraint condition based on the processing time and the memory overhead for each of the computing devices to run each of the computing tasks, the transmission latency for each of the communication tasks, the one or more immediately following task for each of the computing tasks based on the directed acyclic graph, and the one or more immediately following task for each of the computing tasks or each of the communication tasks based on the new directed acyclic graph, and the assignment decisions, the communication decisions and the time decisions, to minimize reasoning completion time of the deep learning model; and inputting an image into a divided computing device, and classifying the image based on the deep learning model that minimizes the reasoning completion time.

2. The method according to claim 1, wherein the one or more constraint condition comprises that:

$C_i \leq S_j$, $\forall i \in \overline{V}$, $\forall j \in \overline{Succ}(i)$, represents that the completion time $C_i$ of the ith computing task or ith communication task is less than or equal to start time $S_j$ of a direct or indirect immediately following computing task or communication task j.

3. The method according to claim 1, wherein the one or more constraint condition comprises that:

$C_i = S_i + \Sigma_{k \in K} p_{ik} x_{ik}$, $\forall i \in V$, represents that when the ith operator is assigned to the kth computing device, the completion time of the ith operator is computing start time plus time required for computing.

4. The method according to claim 1, wherein the one or more constraint condition comprises that:

$\Sigma_{k \in K} x_{ik} = 1$, represents that a sum of values of the assignment decision parameters $x_{ik}$ on all of the K computing devices is 1, one of the operators is calculated by one of the computing devices, and is not interrupted in a computing process.

5. The method according to claim 1, wherein the one or more constraint condition comprises that:

$\Sigma_{i \in E} m_i x_{ik} \leq Mem_k$, $\forall k \in K$, represents that a memory size occupied by operators on each of the computing devices does not exceed a memory size of the computing device.

6. The method according to claim 1, wherein the one or more constraint condition comprises that:

$$S_j \geq C_i - M^s \delta_{ij} - M^l(2-x_{ik}-x_{jk}),$$

$$S_i \geq C_j - M^s(1-\delta_{ij}) - M^l(2-x_{ik}-x_{jk}),$$

wherein, $i \neq j$, $\forall i,j \in V$, $\forall k \in K$, $i \notin Succ(j)$ and $j \notin Succ(i)$, represents that when two operators i and j without a sequential relationship in the directed acyclic graph are assigned on a computing device, one operator is executed by the computing device at a time, and $S_i$ represents a start time of computing task i; $S_j$ represents a start time of computing task j; $C_i$ represents a completion time of computing task i; $C_j$ represents a completion time of computing task j.

7. The method according to claim 1, wherein the one or more constraint condition comprises that:

$z_q \leq 2 - x_{ik} x_{jk}, \forall q \in \overline{V} - V, (i,q),(q,j) \in \overline{E}, \forall k \in K,$ $z_q \geq x_{ik} - x_{jk}, \forall q \in \overline{V} - V, (i,q),(q,j) \in \overline{E}, \forall k \in K,$ $z_q \geq x_{jk} - x_{ik}, \forall q \in \overline{V} - V, (i,q),(q,j) \in \overline{E}, \forall k \in K,$ $u_{qk'k''} > x_{ik'} + x_{jk''} - 1, \forall q \in \overline{V} - V, (i,q),(q,j) \in \overline{E}, \forall k', k'' \in K,$ and $k' \neq k'',$ $z_q = \Sigma_{k' \in K} \Sigma_{k'' \in K} u_{qk'k''},$ $C_q = S_q + z_q p_{qk'k''}^{comm}, \forall q \in \overline{V} - V,$ represents that for the communication task q, $q \in \overline{V} - V$, when two operators that transmit data to each other are assigned to a same computing device, data transmission latency of the communication task q between the two operators is ignored, when two operators that transmit data to each other are assigned to different computing devices, there is data transmission latency, wherein $S_q$ represents start time of the communication task q and $C_q$ represents end time of the communication task q, wherein $z_q$ represents a communication decision parameter; $x_{ik}, x_{jk}, x_{ik'},$ and $x_{jk''}$ are assignment decision parameters, and k' and k'' represent different computing devices; $u_{qk'k''} \in \{0,1\}$ represents a communication decision parameter, and $u_{qk'k''} = 1$ represents that a transmission channel is selected from device k' to k'' to transmit the communication task q.

8. The method according to claim 1, wherein the one or more constraint condition comprises that:

$S_q \geq C_r - M^s \delta_{qr} - M^l(2 - z_q - z_r) + M^r(x_{ak} + x_{ck} - x_{bk} - x_{dk} - 2),$ $S_r \geq C_q - M^s(1 - \delta_{qr}) - M^l(2 - z_q - z_r) + M^r(x_{ak} + x_{ck} - x_{bk} - x_{dk} - 2),$ $S_q \geq C_r - M^s \delta_{qr} - M^l(2 - z_q - z_r) + M^r(x_{bk} + x_{dk} - x_{ak} - x_{ck} - 2),$ $S_r \geq C_q - M^s(1 - \delta_{qr}) - M^l(2 - q_q - z_r) + M_r(x_{bk} + x_{dk} - x_{ak} x_{ck} - 2),$ represents that when there are a plurality of communication tasks between two of the computing devices, one communication task is executed at a time, wherein, $S_q$ represents start time of the communication task q;

$C_q$ represents end time of the communication task q;

$S_r$ represents start time of a communication task r;

$C_r$ represents end time of the communication task r;

$\delta_{qr} \in \{0,1\}$ represents an indicator variable; and $\forall q, r \forall \overline{V} - V, q \notin \overline{Succ}(r)$ and $r \notin \overline{Succ}(q), q \neq r, (a,q),(q,b), (c,r),(r,d) \in \overline{E},$ $\forall k \in K;$ and $M^s, M^l, M^r$ represent numbers tending to positive infinity relative to an index variable, a communication strategy and an assignment strategy, respectively.

9. A deep learning image classification apparatus oriented to heterogeneous computing devices, comprising a memory and one or more processors, wherein executable codes are stored in the memory, and when the executable codes are executed by the one or more processors, the method according to claim 1 is realized.

* * * * *